July 20, 1965 M. WILLIAMS 3,196,416

DATA STORES

Filed June 20, 1961 2 Sheets-Sheet 1

INVENTOR
MICHAEL WILLIAMS

BY Kirschstein, Kirschstein & Ottinger

ATTORNEYS

July 20, 1965 M. WILLIAMS 3,196,416

DATA STORES

Filed June 20, 1961 2 Sheets-Sheet 2

INVENTOR
MICHAEL WILLIAMS
BY Kirschstein, Kirschstein & Ottinger
ATTORNEYS 3,196,416

DATA STORES

Michael Williams, Watford, England, assignor to The General Electric Company Limited, London, England Filed June 20, 1961, Ser. No. 118,397
Claims priority, application Great Britain, June 28, 1960, 22,612/60
6 Claims. (Cl. 340—174)

Figures 1, 2:
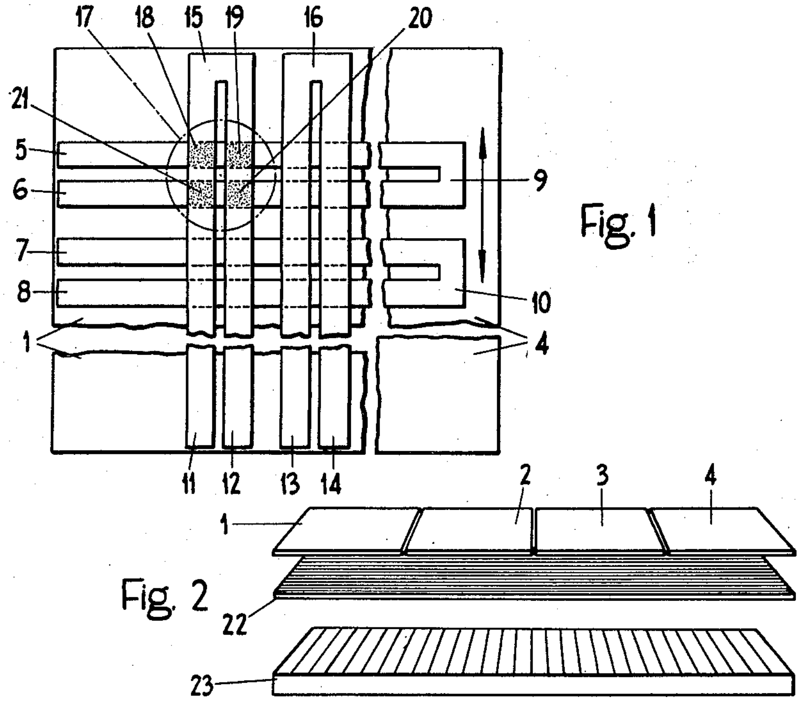

The present invention relates to a data store in which each digit stored is represented by the state of magnetisation of magnetic thin film.

When sufficiently thin film of ferromagnetic material, usually of the order of several hundred or a few thousand Angstrom units thick, is deposited on a sufficiently smooth surface, for example a highly polished glass sheet or a sheet of polished aluminium, at least a substantial area may be caused to behave as though it consisted primarily of a single magnetic domain, that is to say, it is magnetised with an intrinsic magnetisation characteristic of the ferromagnetic material in one or the other sense along a particular direction which will hereinafter be referred to as the easy axis, and which lies in the plane of the film. By the application of a transitory magnetic field of suitable direction and intensity this magnetisation may be reversed, so that it still lies along the easy axis but in the opposite sense. Such an area, therefore, has two states of magnetisation which are stable in the absence of any applied field, and in this specification the term "magnetic thin film" is to be understood to be limited to such films possessing this bi-stable property.

The data stores to which the present invention relates include magnetic thin film and two sets of conductors, hereinafter referred to as drive conductors, which are so disposed that for any pair of conductors, one chosen from one set and one from the other, there is an area of magnetic thin film which is overlaid by both conductors of the pair so as to be subject to the combined magnetic field generated by currents passing along the two conductors. These areas of magnetic thin film form the bi-stable elements in which the digits are stored, and will be referred to as the storage areas. The magnetic thin film may take the form of a continuous sheet, or may consist of discrete areas each including at least one such storage area.

The data store is such that in operation, in order to store a digit in one storage area, a current pulse of suitable amplitude and sense is passed along each of the appropriate pair of drive conductors, the amplitudes of the pulses being sufficient to reverse the direction of magnetisation of the film in the storage area corresponding to that pair of conductors but insufficient to reverse the direction of magnetisation of those parts of the film which are overlaid by only one of the drive conductors. For the purpose of sensing the presence of a digit in a storage area a sense conductor may be provided following the path of one of the drive conductors, but as will be explained below, one of the drive conductors itself may be utilised as a sense conductor. An additional conductor may also be provided in some cases to prevent a change in the direction of magnetisation occurring in a storage area where both drive conductors are energised. Such a conductor will be referred to as an inhibit conductor.

In the present specification a unit suitable for use in such a data store and comprising two sets of drive conductors, the associated magnetic thin film with its support and any sense or inhibit conductors associated with it, will be referred to as a matrix panel.

In a matrix panel each drive conductor extends across magnetic thin film carried on a support, and a return path must be provided for each drive conductor to complete its electrical circuit. One method of doing this which has been proposed is to support the film on a metal plate to which one extremity of each drive conductor is connected, so that the metal plate provides a return path for the drive current. Another arrangement which has also been proposed is to continue each drive conductor along the rear surface of the support to provide the return path, the magnetic field due to the return portion of the drive conductor influencing the same areas of magnetic thin film as the forward part of the conductor.

An object of the present invention is to provide an alternative arrangement of drive conductors for a data store.

According to the present invention in a data store matrix panel each conductor of at least one set of drive conductors has a forward branch and a return branch, each return branch being effective in conjunction with any particular conductor of the other set for modifying the sense of magnetisation of a different area of magnetic thin film from that arranged to be modified by the corresponding forward branch in conjunction with the same conductor of said other set.

In other cases each of said at least one set of drive conductors might have two or more forward branches and two or more corresponding return branches, all in series.

The invention includes data stores comprising at least one matrix panel of the above kind in combination with sources of drive current for supplying drive current pulses to the two sets of drive conductors and output means responsive to output voltages induced in one or more sense conductors (which may be the conductors of one set of drive conductors).

In a matrix panel in accordance with the invention the forward and return branches of the or each set of drive conductors having such branches preferably lie on the same side of the magnetic thin film as each other.

Preferably the magnetic thin film is supported on a conducting surface and the drive conductors, and any associated sense and inhibit conductors, all overlie the film on the same side of the conducting surface.

The use of such a conducting support, which is preferably of highly polished aluminium, tends to reduce the self-inductance of the drive conductors, and where the drive conductors are of considerable length they may be terminated by suitable resistors. The drive conductors preferably take the form of strips whose width is considerably greater than their separation from the conducting support, or from the magnetic thin film if this is on a non-conducting support. The width of the strips is determined partly by the amount of magnetic thin film which each storage area must contain in order to produce an adequate signal, and partly by the consideration that if the strips are made excessively narrow, self-demagnetising effects in the film wall interfere with its satisfactory operation.

It will be appreciated that with the arrangement of the invention each digit is stored in a composite storage area which is distributed among an even number of separate storage areas, half of which are affected in one sense and half in the opposite sense by the currents in the two branches of a drive conductor. It might at first be thought that the result of this is that the components of any sense signal due to the individual areas would in effect cancel each other out, making the stored information impossible to read; however, as will be shown in connection with an embodiment to be described below, this is not the case, and the variations in magnetisation during the reading process are additive.

In many cases the distribution of the storage area for each digit over separate portions of the magnetic thin film which are magnetised in opposite senses makes it practicable to use a magnetic thin film manufactured to less stringent tolerances, with the result that the store may be made considerably cheaper.

Usually it will be convenient to have the drive conductors in parallel sets at right-angles to each other and to have the direction of the easy axis of the film parallel or approximately parallel to the conductors of one set. The sense conductors are preferably constituted by the drive conductors which are approximately perpendicular to the easy axis of the film, but separate sense conductors may be provided, in which case they should follow the course of this latter set of drive conductors, and should preferably be narrower than the drive conductors and positioned between them and the magnetic thin film.

In a preferred construction of matrix panel according to the invention suitable for a data store of the word selection type the conductors of one set are parallel or approximately parallel to the easy axis of the film and will be referred to as the word conductors, while the conductors of the other set are roughly perpendicular to the easy axis and will be referred to as the digit conductors. The number of digit conductors corresponds to the number of digits in each word (i.e., associated set of digits) that the store is capable of storing, while the number of word conductors corresponds to the number of words representing the capacity of that particular matrix panel of the store to store associated sets of digits. In general the number of word conductors will be very much greater than the number of digit conductors, and their length will be very much shorter. With such an arrangement it may be advantageous for each word conductor to traverse the film twice, consisting of a forward branch and a return branch, parallel and closely adjacent to one another, and connected in series, the digit conductors, which preferably also function as sense conductors, being single. This arrangement allows each digit to be stored in two areas which are closely adjacent to one another, and therefore subject to similar slight deviations of the film easy axis from the required direction, but are magnetised in opposite senses by the word drive currents. The arrangement thereby increases the permissible tolerance in the orientation of the easy axis of the film.

Where the lengths of the drive conductors and the speed of working permit, the conductors may be further doubled, i.e. by doubling the digit drive conductors or making the word drive conductors follow a four-fold path, or both.

The ends of the forward and return branches of a drive conductor may be connected through a resistor designed to match the impedance of the conductor as a transmission line, but where the length of the conductors and the speed of working permit, it will be more convenient to short-circuit the ends in order to obtain as high a current as possible for a given capacity of pulse generator.

Figure 3:
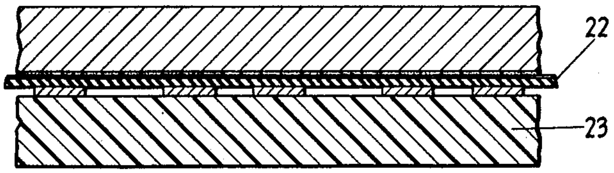
Figure 4:
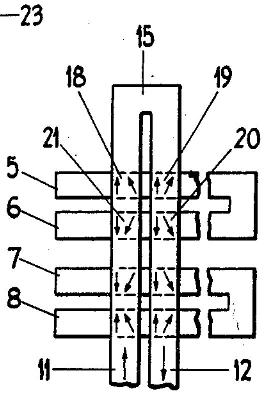
Figure 5:
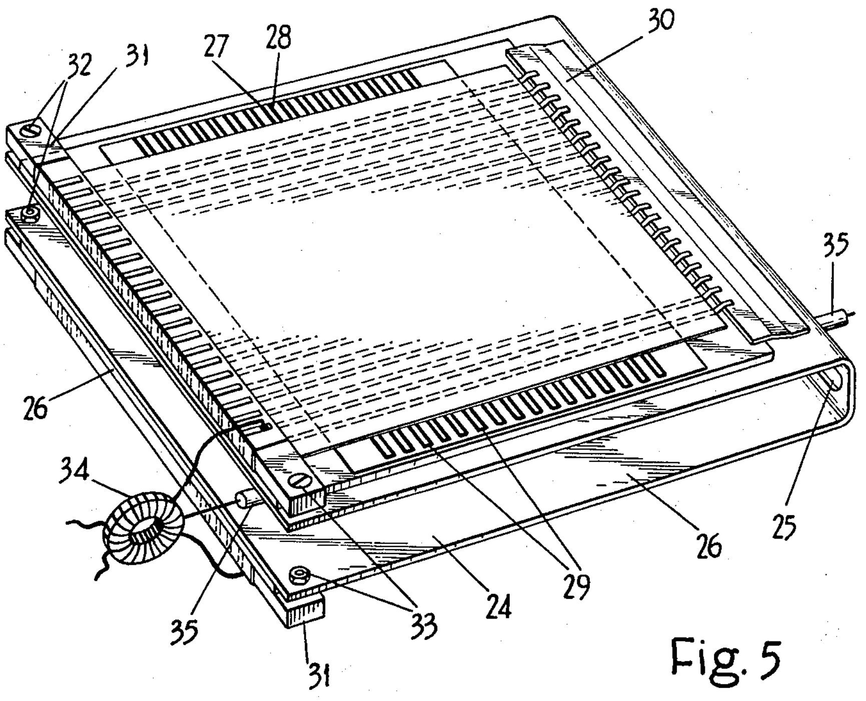

The construction and operation of a matrix panel for a data store will now be described by way of example with reference to the accompanying drawings which are schematic only, and in which, FIGURE 1 is a diagram illustrating the essential components of a matrix panel employing four film areas to store each binary digit, FIGURE 2 is an exploded view indicating its manner of construction, FIGURE 3 is a fragmentary cross-section of the panel, FIGURE 4 is a diagram illustrating the senses of magnetisation of the areas of the film in which two binary digits are stored, and FIGURE 5 is a perspective view of another matrix panel employing two film areas to store each binary digit.

Referring first to FIGURES 1 and 2, the store comprises four sheets of polished aluminium, 1, 2, 3, and 4, on the polished surfaces of which a thin film of ferromagnetic material has been deposited with its easy axis running in a direction shown by the arrow in FIGURE 1. These four sheets are assembled side by side and are electrically connected together.

Referring now particularly to FIGURE 1, two sets of drive conductors overlie these sheets. The first set constitutes the digit drive conductors, each of which consists of a pair of strips connected together at the right-hand end, there being 52 such pairs, corresponding to a word-length of 52 digits. Two pairs are shown in FIGURE 1, consisting of a forward conductor 5 and its return branch 6, and a second forward conductor 7 with its return branch 8, the forward and return branches being connected at the right hand end as indicated at 9 and 10. These conductors are at right angles to the easy axis of the film, and therefore when activated produce magnetic fields in the underlying film in one or the other sense along the easy axis.

Overlying this set of digit drive conductors is a second set of conductors, perpendicular to them, and therefore parallel to the easy axis of the films, forming the word drive conductors. There are 200 of them corresponding to a storage capacity of 200 words each of 52 binary digits. Each of the word conductors is constructed similarly to the digit conductor, consisting of two strips providing a forward and return branch for the word drive current. Two such conductors are shown in FIGURE 1, the strips 11 and 12 comprising one conductor, and the strips 13 and 14 comprising the other, and the conductors being respectively connected at their further ends at 15 and 16.

The portion of the store responsible for the storage of one binary digit is that contained within the dashed outline 17, and the digit is stored in the four small areas of magnetic thin film 18, 19, 20 and 21, which underlie the crossings of the strips 5 and 6 forming a digit conductor with the strips 11 and 12 forming a word conductor.

In normal operation of the store for writing a word into the matrix panel, the appropriate word conductor is energised and at the same time each of the digit conductors is energised by a pulse which represents, by its polarity, a "1" or a "0" as the case may be. For reading non-destructively the information contained in the store the appropriate word conductor is energised and the digit conductor is used as a sensing conductor, the polarity of the pulse induced on it representing a "1" or a "0" as the case may be. This manner of operation is described in United States patent application Serial No. 815,840, filed May 26, 1959, and now abandoned, and assigned to the assignee of the present application.

Referring now particularly to FIGURES 2 and 3, the magnetic thin film is carried on the surface of the plates 1, 2, 3, 4, which face downwards in the figures. The digit conductors are formed from a film of aluminium on the surface of a very thin film of insulating material, for example they may be formed by cementing a very thin aluminium foil to a layer of polyethylene terephthalate film of say one thousandth of an inch thickness and forming the conductors in the required configuration from this aluminium foil by a photo-etching method. The sheet of digit conductors 22 so formed is anodised to form a very thin insulating layer over the aluminium conductors themselves, and this insulated surface is assembled and possibly cemented in contact with the magnetic film coated on to the aluminium plates 1, 2, 3, 4.

The word conductors are similarly formed by printed circuit methods on the copper-clad surface of a phenolic plastic printed circuit board 23 which is laid against the underside of the polyethylene terephthalate film carrying the digit conductors, and with the copper word conductors in contact with the underside of the film. Tabs (not shown) are provided at the edges of the sheet 22 and the printed circuit board 23 for making the necessary connection to the digit and word drive conductors.

FIGURE 4 is a schematic diagram showing the components of the portion of a panel as indicated in FIGURE 1 which are responsible for the storage of two consecutive digits of a word, assumed to the "0" and "1." In writing of the word into the store the location of the word is selected by energising the word conductor constituted by the strips 11 and 12 short-circuited at 15, and a pulse of current passes up the conducting strip 11 and down the strip 12. At the same time pulses of current are passed along the strip 5 returning along the strip 6 to write the digit "0" into the four small areas underlying the crossing of these word and digit drive conductors and along the strip 8 and returning along the strip 7 to write a digit "1" into the crossing of this conductor with the word conductor. It is arranged that the current pulse along the word conductor should cease before that along the digit conductors starts to fall. After the cessation of both pulses the directions of the magnetic fields in the eight small areas underlying the crossings of the various conducting strips are as shown by the left-hand arrows in each case, that is to say, vertically upwards in the situation shown in the figure for the areas 18 and 19 and downwards for the areas 20 and 21. In the case of the lower storage area these directions are reversed.

For the purpose of reading the information contained in the store a reading pulse is applied along the strip 11, returning along the strip 12, and the conductors constituted by the strips 5 and 6 and 7 and 8 are now utilised as sense conductors. Considering first the upper storage area, it will be seen that the effect of the current in the conductors 11 and 12 is to rotate the magnetisation in the film in the areas 19 and 21 in a clockwise direction, and in the areas 18 and 20 in a counter-clockwise direction. The effect of this is, in each case, to diminish the magnetic field linked with the conductors 5 and 6. Since the magnetic field of the areas 18 and 19 linked with the conductor 5 is opposite in sense to that of the areas 20 and 21 linked with the conductor 6, and since the direction of the conductor 5 is opposite to that of the conductor 6, all these changes in the magnetic field linked with the conductors act in the same direction, and the result is to produce voltage pulses which reinforce one another. Similarly in the lower storage area defined by the conductors 11, 12 and 7, 8 the conditions are similar, but the direction of magnetisation linked with the conductor is everywhere reversed, so that the induced voltages again reinforce each other, but the pulse produced in this pair of conductors is of reversed polarity.

Usually the reading operation erases the information contained in the store, and if it is desired to retain this information, the associated circuits must include a provision for it to be rewritten. By suitable timing of the pulses it is possible for a word to be read from the store and for the same, or a different word to be written in its place during a single pulse on the word drive conductors, the method being known as applied to ferrite core matrix stores. However, in some cases it is possible, by using a reading pulse of smaller magnitude than the writing pulse, to read the information without erasing it.

Should it be desired to improve the speed with which the information may be written into or read from the store the short-circuited portions 9 and 10 and possibly also portions such as 15 and 16 of the conducting pairs of strips may be replaced by resistors matched to the characteristic impedance of the lines formed by these pairs. In some cases this will necessitate an increase in the power which the pulse generators must supply to the drive conductors.

The matrix panel shown in FIGURE 5 employs two areas of film to store each binary digit. In this panel the word conductors are double, and the digit conductors, which serve also as sense conductors, are single.

The matrix panel is double, being carried on the outer surfaces of a copper carrying member 24 which consists of a rectangular copper sheet folded back on itself into a U-shaped cross section. The bend of the U has a slot 25 to admit the co-axial cables which carry the output from the digit conductors when they are used for reading the information in the store, and two symmetrical halves of the matrix assembly are carried on the outer sides of the member 24, only that on the upper side being visible in the view of FIGURE 5.

This half of the matrix consists of a very highly polished aluminium plate 26 on the upper surface of which there is deposited by vacuum evaporation a film about 800 Angstrom units thick of ferromagnetic alloy of initial composition 80% nickel, 17% iron, 3% cobalt on top of which there is cemented an insulating plastic film carrying on its upper surface sixteen closely-spaced pairs of copper conducting strips which serve as the word conductors. These extend from side to side of the copper carrying member 24 and the easy axis of magnetization of the film carried by the aluminum plate 26 is parallel to them. Each word conductor consists of a pair of strips such as 27, 28 separated by a narrow gap and connected together at one end as shown at 29, the strips providing a forward and return branch for modifying the direction of magnetisation of the areas of magnetic thin film including them at their crossing with the digit conductors. At the other end connections (not shown) are soldered to the exposed ends of the strips to connect them to the source of word drive current.

The sets of word conductors such as 27, 28 were each formed of copper foil 0.001 inch thick cemented by means of a pressure-sensitive adhesive sold under the registered trademark "Arafix" to a film of polyethylene terephthalate 0.0005 inch thick. The conductors were formed from the copper by known photo-etching methods, the word conductors consisting of two strips 0.020 inch wide separated by a gap of 0.020 inch and joined at one end, each word conductor being separated from the next by a gap of 0.080 inch. Twenty digit drive conductors were similarly formed from 0.001 inch thick copper foil on 0.0005 plastic film, each being 0.020 inch wide and separated from the next by a gap of 0.040 inch. The conductors are assembled and cemented in position on the aluminium plate 26 with the insulating film downward, the word conductors being applied first, followed by the digit conductors, and finally by an insulating film of 0.003 inch thick poly-ethylene terephthalate, each layer being cemented in position with the same adhesive as before. Each sheet of conductors projects somewhat beyond the edge of the aluminium plate 26 where the connections are required to be made.

The plates 26 are clamped in position at each end on the copper carrying member 24. At the end nearest the slot 25 each plate is held under a copper strip 30 soldered along one edge to the member 24 and with the other edge bearing against the edge of the plate 26. The other end of the plate 26 is clamped in position by a copper clamping bar 31 held down by clamping screws 32, 33. The insulating film carrying the digit conductors is folded back over the bar 31 and the outermost layer of insulating film stripped off to enable connections to be made to the digit conductors.

A small toroidal digit drive transformer 34 for each digit conductor, only one of which is shown in FIGURE 5 for clarity, has a primary winding for connection to the source of digit drive current and a centre-tapped secondary winding. One end of this secondary winding is connected to a digit drive conductor in the upper half of the matrix, and the other end is connected to the corresponding digit drive conductor in the lower half of the matrix, the centre tapping being connected to the inner conductor of a coaxial line 35, only one of which is shown in the drawings, and which passes between the two halves of the copper carrying member 24 and through the slot 25, its outer conductor being soldered to the member 24 where it passes through the slot. The coaxial line 35 is connected to a sense amplifier for reading the information contained in the store.

To write information into the store a pair of word conductors such as 27, 28 are energized, thus determining the location in which the word is to be written and pulses are applied to the digit drive conductors in one or the other sense, depending on whether the digit to be written is a "0" or a "1," through the primary winding of the digit drive transformers 34. The current in the word conductors is allowed to fall before the digit drive pulse dies away and the magnetizations of each pair of areas of magnetic thin film underlying the pair of word drive conductors and a digit conductor fall back into directions determined by the sense of the digit current.

To read the information written into the store the appropriate word conductor pair is energized, rotating the magnetization of the areas underlying it out of the direction of the easy axis as described above with reference to the areas 18 and 19 of FIGURE 4, and so causing voltage pulses to be induced in the digit drive conductors (which are now acting as sense conductors for reading the information). These pulses are fed via the transformers 34 on to the coaxial lines 35, and so to the sense amplifiers. If the pulses employed for reading are of sufficient amplitude to erase the information it is of course necessary to provide for it to be re-written.

It will be noted that by reason of the balanced construction of the two halves of the matrix and the symmetry of the transformer 34 the digit drive pulse is prevented from reaching and overloading the sense amplifier. It is necessary by reason of this balanced construction to reverse the polarity of either the drive pulses applied to one half of the matrix or the corresponding output pulses.

I claim:

1. A data store matrix panel in which, in operation, stored data is represented by the directions of magnetization of a plurality of storage elements incorporated in the film of a magnetic thin film device, said matrix panel incorporating two sets of drive conductors, each conductor of each set crossing the conductors of the other set in such a manner that, at each crossing point, the axis of one of the conductors associated with the crossing point is at least approximately parallel to the easy axis of the film while the axis of the other conductor associated with the crossing point is at least approximately perpendicular to the easy axis of the film, each part of the film adjacent the crossing point effectively forming a storage element, and each drive conductor of at least one set including two generally parallel adjacent portions which are disposed on the same side of the film and which are connected together in series in such a manner that, in operation, a current pulse passed through the drive conductor passes in one sense through one of the portions and in the opposite sense through the other of the portions.

2. A matrix panel according to claim 1, in which each drive conductor of said at least one set of drive conductors includes four generally parallel adjacent portions which are all connected in series in such a manner that, in operation, a current pulse passed through the drive conductor passes in one sense through one portion of each adjacent pair of portions and in the opposite sense through the other portion of the adjacent pair.

3. A matrix panel according to claim 1 in which the film is formed on a smooth surface of a non-magnetic electrically conducting support, the drive conductors being disposed on that side of the film remote from the support.

4. A matrix panel according to claim 3, in which each drive conductor is in the form of a strip whose width is greater than its separation from the support.

5. A matrix panel according to claim 1, in which those drive conductors whose axes are arranged at least approximately perpendicular to the easy axis of the film at the crossing points are arranged to function also as sense conductors for reading out information stored in the panel.

6. A matrix panel according to claim 1 in which the drive conductors of both sets each includes two generally parallel adjacent portions connected together in series in such a manner that, in operation, a current pulse passed through a drive conductor passes in one sense through one of the portions of the drive conductor and in the opposite sense through the other of the portions.

References Cited by the Examiner

FOREIGN PATENTS 845,605 8/60 Great Britain.

OTHER REFERENCES

Publication I: Electronics, "Making Reproducible Magnetic Film" by E. M. Bradley, pages 78 and 79, Sept. 9, 1960.

IRVING L. SRAGOW, *Primary Examiner.*